United States Patent [19]
Gajewska

[11] Patent Number: 5,826,547
[45] Date of Patent: Oct. 27, 1998

[54] LEASH

[76] Inventor: Anna Gajewska, 19921 Sheffield La., Huntington Beach, Calif. 92646-4025

[21] Appl. No.: 852,090

[22] Filed: May 6, 1997

[51] Int. Cl.[6] .................................................. A01K 27/00
[52] U.S. Cl. .......................... 119/795; 119/792; 119/793
[58] Field of Search .................... 119/795, 719, 119/792, 793, 794, 796, 797, 798, 799

[56]  References Cited

U.S. PATENT DOCUMENTS

| | | | |
|---|---|---|---|
| 3,072,091 | 1/1963 | Morchand | 119/719 |
| 3,603,295 | 9/1971 | Shumann | 119/795 |
| 4,018,189 | 4/1977 | Umphries et al. | 119/797 |
| 4,513,692 | 4/1985 | Kuhnsman | 119/795 |
| 4,537,155 | 8/1985 | Bvratovich | 119/797 |
| 5,087,220 | 2/1992 | Cotita | 119/719 |
| 5,429,075 | 7/1995 | Passarella et al. | 119/795 |
| 5,441,017 | 8/1995 | Lindsay | 119/795 |
| 5,456,214 | 10/1995 | Quilling | 119/795 |
| 5,494,002 | 2/1996 | Greene | 119/719 |

FOREIGN PATENT DOCUMENTS 684045  7/1994  Switzerland ........................... 119/198

*Primary Examiner*—Paul J. Hirsch
*Attorney, Agent, or Firm*—Mark A. Oathout

[57]  ABSTRACT

The present invention relates to an improved leash for walking, running and controlling dogs, cats or even children (all are referred to below as a "dog"). The handle of the leash is designed such that the holder can exert greater control over the dog, and the handle is simple, comfortable, economical and secure.

4 Claims, 4 Drawing Sheets

LEASH

BACKGROUND

A wide variety of dog leashes are currently available on the market. These leashes typically have a handle, a rope or chain, and a collar or harness. The most common type of handle is a band or loop made of fabric or leather. Other type of handles include automatic retracting leashes which are more expensive and complex to make. All of these leashes leave room for improvement in areas such as control, comfort and security. For example, when large dogs pull with excessive force on the leash, the dog will become harder to control, the handle may slip out of the holder's hand, and handles, such as the fabric handles, may cause discomfort because they dig into the holder's hand.

Handles attached to a rope in a manner similar to the present invention may have been used in certain sporting activities such as water skiing or kite flying but no one heretofore recognized or suggested such could be used for a leash.

SUMMARY OF THE INVENTION

The present invention relates to an improved leash for walking, running and controlling dogs, cats or even children (all are referred to below as a "dog"). The handle of the leash is designed such that the holder can exert greater control over the dog, and the handle is simple, comfortable, economical and secure.

DETAILED DESCRIPTION OF THE INVENTION

Figure 1:
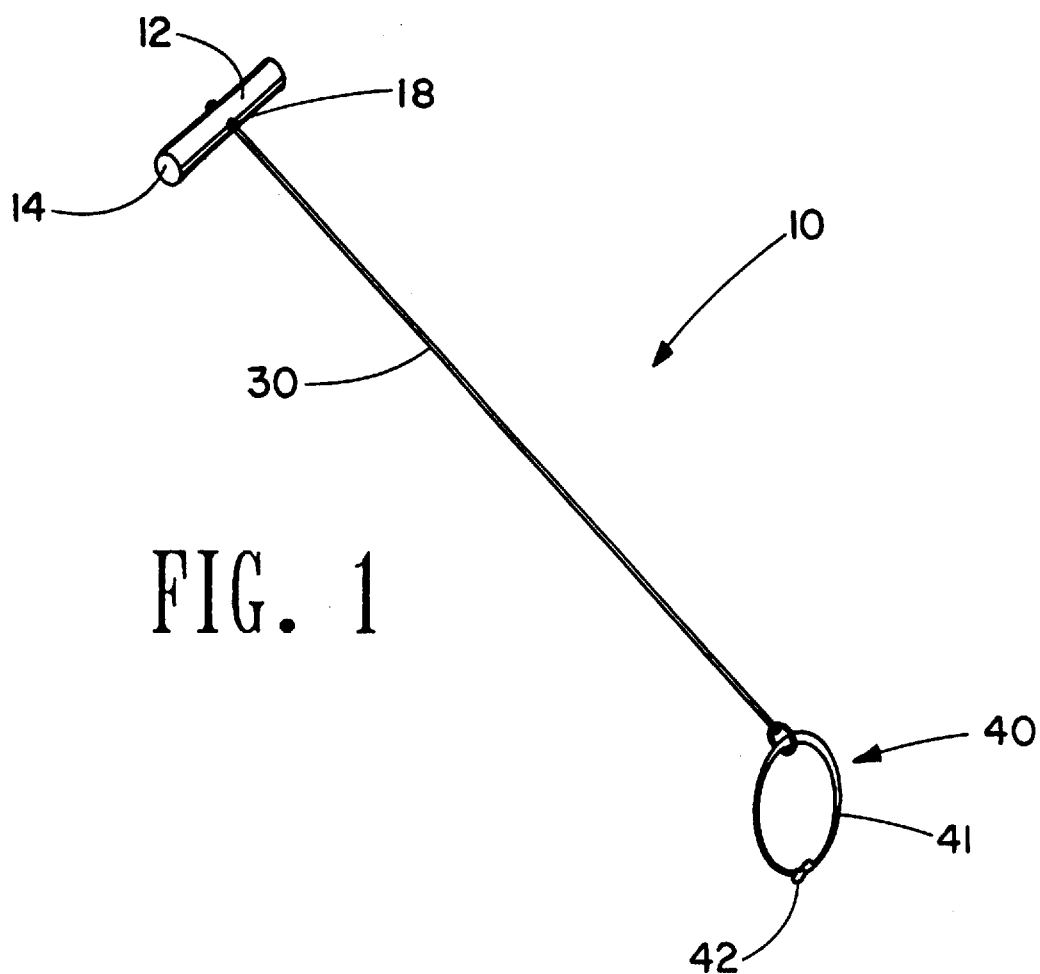
FIG. 1 is a perspective view of the invention.
Figure 2:
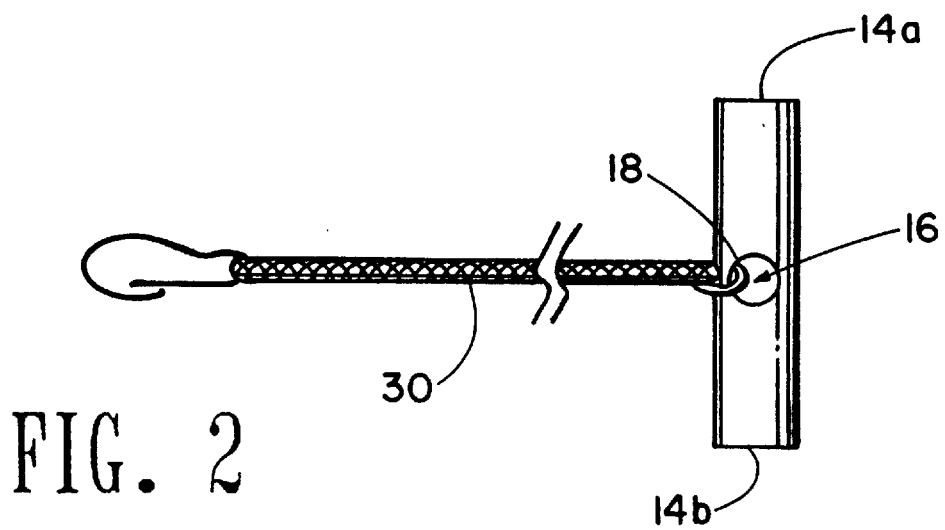
FIG. 2 is a top view of the invention.
Figure 3:
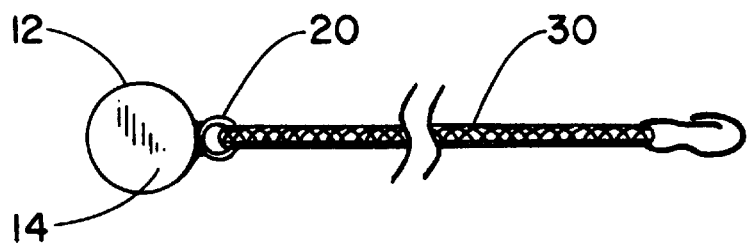
FIG. 3 is an elevational view from the end of the invention.
Figure 4:
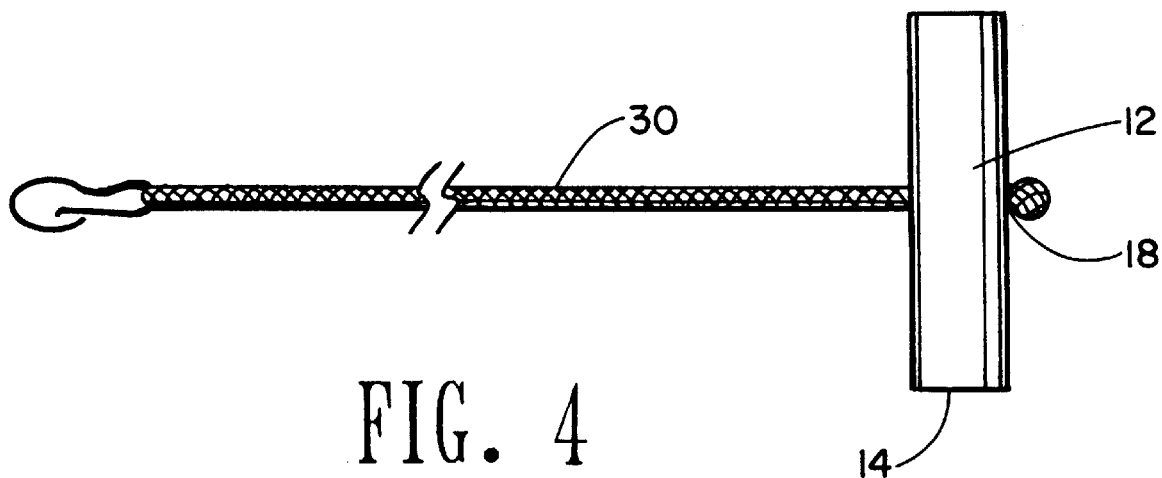
FIG. 4 is a view of another embodiment of the invention.

Referring to FIGS. 1–5, the improved leash 10 is shown. The leash 10 generally includes a handle 12, a rope or chain 30 and a collar or harness 40.

The handle 12 or grip is cylindrical and is approximately ten to twelve inches long in the axial direction with a diameter of approximately three quarters of an inch. When viewed from the end 14 (FIG. 3), the handle 12 is round. The handle 12 is preferably made from wood or plastic and is one solid piece. A rope, chain, string, cable, etc. 30 is attached to the center 18 (the center is defined as a point or points on the handle 12 which rest in a plane equidistant from both ends 14a and 14b) of the handle 12. To make this attachment, either a hole 16 is made through the center 18 of the handle 12 and the rope 30 can be inserted through the hole 16 and secured, or a hook or eye 20 (FIG. 3) can be anchored to the center 18 of the handle 12 with the rope 30 attached to the hook or eye 20.

A collar or harness 40 is located at the other end of the rope 30. Any type of collar or harness 40 which can be used for holding a dog may be incorporated. For example, the collar or harness 40 may simply comprise a thin strip of material 41 which may have a slip knot 42 for securing the collar or harness 40 around the neck of the dog.

The invention is advantageous because of the combination of features of the invention, including the fact that the handle 12 is somewhat "heavy duty", the rope 30 is attached to the center 18 of the handle 12 and the handle 12 is convenient and ergonomic for grasping by the human hand 50. Some of the advantages achieved by this design include the following.

Figure 5:
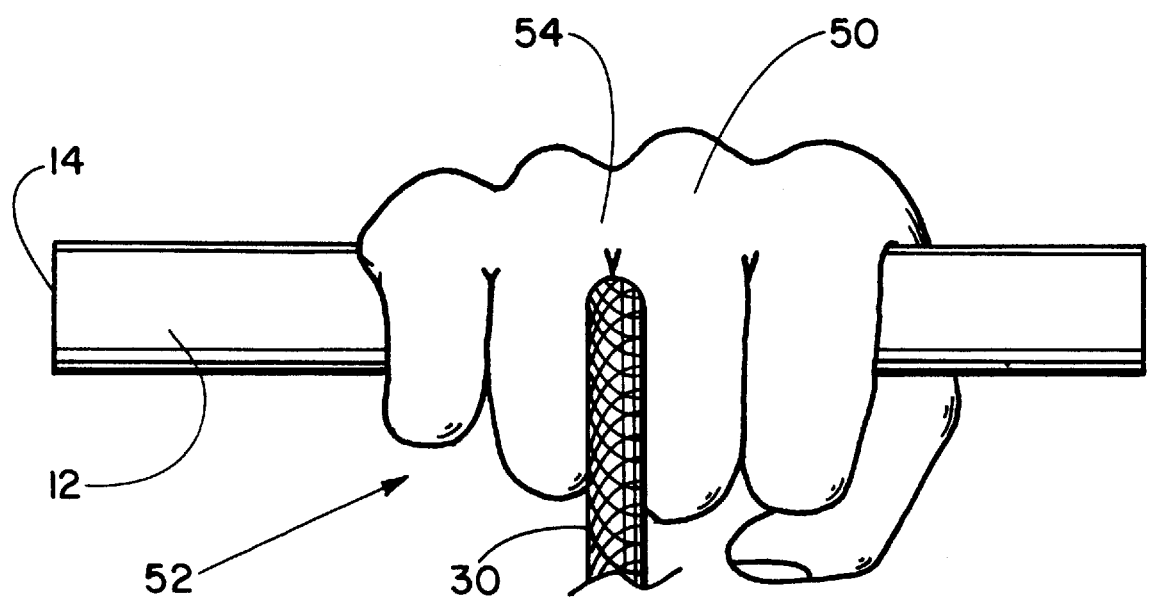
FIG. 5 is a view of the handle held in a hand with a horizontal grip.

1. The handle 12 is easy and comfortable to hold and is normally held with a natural horizontal grip as shown in FIG. 5, but can be held with a vertical grip or at any position/angle inbetween;
2. The leash 10 is easy to control. Bigger dogs exert a greater pulling force in which case the greater this advantage becomes. This advantage is attributable to features such as the handle 12 is held between the fingers 52 and the palm (not shown) with the rope 30 attached to the center 18 of the solid handle 12, within the fingers 52 (there is no lever effect as with some leash handles where the rope attaches to a handle at a point away or outside the hand), the handle 12 is easy to steer and psychologically the handle 12 has a sports-like feel;
3. The leash 10 is very economical as it is simple to manufacture and is composed of inexpensive parts;
4. The handle 12 is secure within the hand, even when a dog pulls with an unexpected and large force because such a force will be directed between the fingers 52 at the base or knuckle area 54 of the fingers 52 (where the finger joins the metacarpus);
5. The handle 12 is universal in application;
6. The handle 12 can be used as a club to give the user a sense of security, to discipline a dog or to repel attackers.

An additional advantage relating to the invention relates to a technique or method of use of the invention whereby the length of the rope or leash 30 can be shortened (or lengthened) by twisting the handle 12 to wrap the rope 30 around the handle while the handle can still be used to control the dog.

Figure 6:
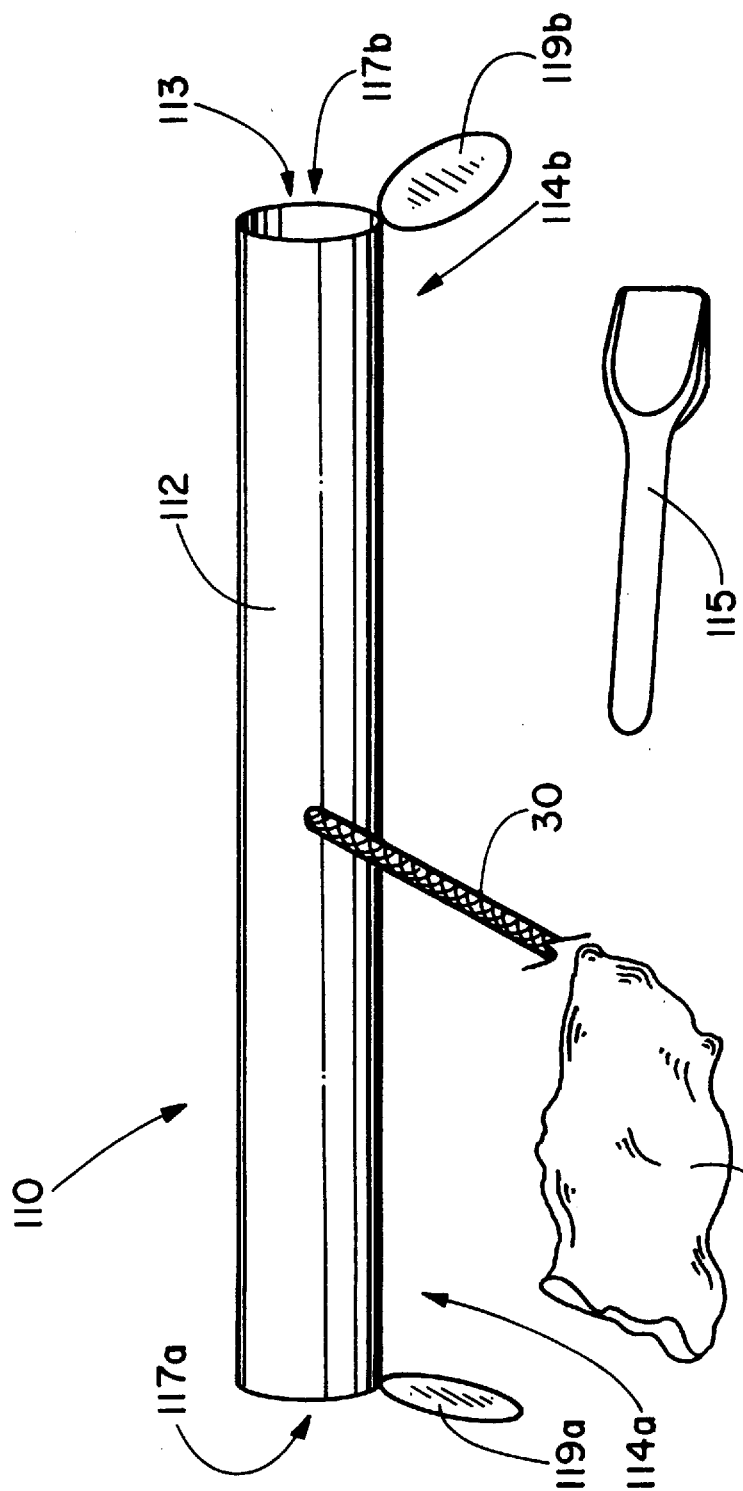
FIG. 6 is a view of another embodiment of the invention.

Referring now to FIG. 6, another embodiment 110 of the invention is shown. In this embodiment, the handle 112 is hollowed out and used as a small compartment or container for keeping things, like cookies, dog treats, dog droppings, etc. The hollow interior space 113 could also be used for the installation of a sound device (not shown) such as a radio or other sound transmitter to entertain the user or to give sound signals to the dog.

The compartment/handle 112 may have a larger diameter than the handle 12 previously discussed. For example, the handle 112 may be 1 and ½ inches in diameter or greater. This allows for an interior space 113 which has enough volume to accommodate a plastic bag 121, dog droppings (not shown), a sound device, or a miniature scoop 115. A scoop 115 and/or bag are practical for picking up dog droppings. The scoop 115 could be made of paper like materials such as those used to make paper plates or trays, making the scoop 115 disposable. Therefore, the handle 112 could be sold with a pack of disposable scoops 115 and plastic bags 121. The scoops 115 could be made of other materials such as for example plastic.

The size of the handle 112 can vary as needed to accommodate the size of the material to be stored within the handle 112. The handle 112 may have a first compartment 117a at one end 114a which can be used for storing the plastic bag 121, and a second compartment 117b at the other end 114b which can be used for storing the scoop 115. The ends 114a and b may be closed by any known means such as hinged caps 119a and b.

The plastic bag 121 may be used in the invention as follows. The first end 114a of the handle 112 can be opened or the cap 119a removed. Then the plastic bag 121 is removed from the handle 112 and the user places the plastic bag 121 over their hand to insulate or protect their hand from the dog dropping. The user then picks up the dog dropping with their hand which is covered by the plastic bag 121. The user then takes their other hand and pulls the bag 121 off the hand while turning the bag inside out so that the dropping will now be contained on the inside of the bag as the bag comes off the users hand. The bag 121 can then be wrapped, tied shut or sealed and reinserted into the handle 112 where it can remain stored until the user is ready to take it out and place it in a trash container.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

What is claimed is:

1. A handle for a dog leash, comprising:
   said handle having a cylinder shape with an axial length in the approximate range of 10 to 12 inches;
   said handle having a diameter of approximately ¾ of an inch;
   said handle being made of a solid material; and
   said handle including a means for embedding the dog leash through a center of said handle.

2. A handle for a dog leash, comprising:
   said a handle having a cylinder shape with an axial length in the approximate range of 10 to 12 inches;
   said handle having a diameter greater than about ¾ of an inch;
   said handle being made of a solid material;
   said handle including a means for embedding the dog leash through a center of said handle;
   said handle defining a first compartment located at one end of said handle and a second compartment located at the other end of said handle; and
   a first and second cap for closing said first compartment and said second compartment, respectively.

3. The dog leash handle according to claim 2, further including a means for transmitting sound installed in said first compartment.

4. The dog leash handle according to claim 2, further including a means for picking up a dog dropping placed in said first compartment.

\* \* \* \* \*